(12) United States Patent
Ellringmann et al.

(10) Patent No.: US 8,173,252 B2
(45) Date of Patent: May 8, 2012

(54) PSA TAPES FOR SPLICING FLAT WEB MATERIALS

(75) Inventors: Kai Ellringmann, Hamburg (DE);
Stefan Wulf, Mönchengladbach (DE);
Stephan Zöllner, Buchholz / Nordheide (DE); Nils Utesch, Hamburg (DE);
Christoph Nagel, Hamburg (DE)

(73) Assignee: tesa SE, Hamburg (DE)

(*) Notice: Subject to any disclaimer, the term of this patent is extended or adjusted under 35 U.S.C. 154(b) by 722 days.

(21) Appl. No.: 12/265,848

(22) Filed: Nov. 6, 2008

(65) Prior Publication Data

US 2009/0117310 A1  May 7, 2009

(30) Foreign Application Priority Data

Nov. 7, 2007  (DE) .................. 10 2007 053 432

(51) Int. Cl.
*B32B 27/28* (2006.01)
(52) U.S. Cl. ............ 428/345; 428/43; 428/57; 428/343; 428/355 R; 156/157
(58) Field of Classification Search .................. None
See application file for complete search history.

(56) References Cited

U.S. PATENT DOCUMENTS

| | | | |
|---|---|---|---|
| 4,905,924 A | 3/1990 | Moore | |
| 5,292,586 A * | 3/1994 | Lin et al. | 428/355 R |
| 5,576,110 A * | 11/1996 | Lin et al. | 428/447 |
| 5,580,915 A * | 12/1996 | Lin | 524/267 |
| 6,432,241 B1 | 8/2002 | Congard et al. | |
| 6,740,379 B1 | 5/2004 | Congard et al. | |
| 2003/0010422 A1 * | 1/2003 | Starkey | 156/157 |
| 2004/0219355 A1 | 11/2004 | Clemmens et al. | |

FOREIGN PATENT DOCUMENTS

| | | |
|---|---|---|
| DE | 42 33 521 | 4/1994 |
| DE | 198 30 674 | 1/2000 |
| DE | 100 58 956 | 6/2002 |
| DE | 101 23 981 | 1/2003 |
| DE | 102 10 192 | 10/2003 |
| DE | 10 2005 054 781 A1 | 5/2007 |
| EP | 0 450 312 | 10/1991 |
| EP | 0 566 880 | 10/1993 |
| EP | 0 757 657 | 2/1997 |
| EP | 1 640 301 A | 3/2006 |
| WO | 91 08159 | 6/1991 |
| WO | 03/008311 A | 1/2003 |
| WO | 03 018451 | 3/2003 |
| WO | 03 018453 | 3/2003 |
| WO | 03 018454 | 3/2003 |
| WO | 03 018542 | 3/2003 |
| WO | 03 024850 | 3/2003 |
| WO | 2007/057304 A | 5/2007 |
| WO | WO 2010/056543 * | 5/2010 |

OTHER PUBLICATIONS

"Viscosity-Molecular Weight Relationship for Polydimethylsiloxane" authored by Kataoka et al. and published in Polymer Letters (1966) 4, 317-322.*

* cited by examiner

*Primary Examiner* — Marc Zimmer
(74) *Attorney, Agent, or Firm* — Norris McLaughlin & Marcus PA

(57) ABSTRACT

The invention relates to pressure-sensitive adhesive tapes for flying splice of flat web materials, having at least one splittable carrier and two layers of adhesive, at least one of the adhesives being a silicone PSA, more particularly an electron-beam-crosslinked silicone PSA, and also to a method of producing them. The silicone PSA advantageously has at least one polydiorganosiloxane having the structure —Si$(R_2)$—O—[Si$(R_2)$—O]$_n$—Si$(R_2)$—, where the 2n+4 substituents R independently of one another are monovalent hydrocarbon radicals and n is an integer, and also at least one resin ("MQ resin") constructed from $(R^2)_3SiO_{1/2}$— units ("M units") and $SiO_{4/2}$ units ("Q units"), the substituents $R^2$ of the M units being independently of one another alkyl groups, alkenyl groups, alkylsilyl groups, hydroxyl groups or hydrogen.

18 Claims, 2 Drawing Sheets

PSA TAPES FOR SPLICING FLAT WEB MATERIALS

The invention relates to an adhesive tape for splicing of non-polar flat web material wound up onto rolls, more particularly for flying splice, in accordance with the features of the preamble of the main claim, and also to a method of producing the adhesive tapes.

In the processing of flat web material (paper, films, nonwovens or the like), flying splice is a common method of replacing an outgoing, almost fully unwound roll by a new roll without having to stop the high-speed machine. Splicing rolls on the fly in this way is frequently performed using pressure-sensitive adhesive tapes in order to join the end of the outgoing web to the start of the incoming web.

Performing a flying splice (also called "dynamic splice") is accomplished in the industry more particularly by the following method.

Double-sided self-adhesive tapes are bonded manually to the start of the web of the new roll in an advantageous arrangement (typically w- or v-shaped) and the web material protruding beyond the adhesive tape is removed. Additionally the start of the web of the new roll is fastened using fastening labels (or "tabs") to the underneath turn of the new roll, in order to prevent the web unwinding when the new roll is accelerated to the circumferential speed of the old roll. Disadvantages with this method are that the preparation of the rolls is very time-consuming and the bonding requires the deployment of skilled personnel. Moreover, the method does not always lead to the desired results, since the bonds obtained in this way, as a result of the overlaying of web material, fastening labels and adhesive strips, are relatively thick. Furthermore, particularly in the case of thin, flexible web materials, it is possible for the stream of air in the opposite direction that occurs in the course of rotation to cause bulges to appear in the web material at the start of an incoming web, which can lead in general to poor bonding of the webs.

The above method is also employed in the paper-processing industry. In that industry, in a development of the splice or splicing method, the tab used for fastening is integrated into the self-adhesive tape that joins the paper webs. After the webs have been joined, the splittable carrier, serving here as a tab, undergoes splitting, and so part of the splittable carrier remains on the self-adhesive tape that joins the webs (i.e. on the top turn), while the other part remain on the underneath turn. Carriers referred to as "splittable" are those which can be split parallel to their two-dimensional extent, and more particularly carriers of the kind which also actually split, based on the requirements in a splice method.

Adhesive tapes known in the art for flying splice have a number of disadvantages when the flying splice is to be performed on flat web materials other than paper. For instance, the known adhesive tapes for flying splice have no adhesion, or no adequate adhesion, on silicone surfaces, in other words not on flat web materials made of silicone or on flat web materials having siliconized surfaces. One of the reasons for this is the very low surface energy of silicone, which is situated within a region of $\leq 24$ mN/m. A further disadvantage of the adhesive tapes proposed by the prior art for the field of flying splice is that these adhesive tapes typically only have thermal shear strengths in temperature ranges below 100° C., often only up to about 95° C.

Adhesive tapes which are to be suitable for the flying splice of the flat web materials having silicone surfaces or siliconized surfaces, however, are required to fulfill an exacting profile of requirements. They must exhibit excellent adhesion to precisely these materials. A further requirement is that they possess good tack, in order to attach reliably even in the case of very short contact times, but at the same time are required to possess sufficient cohesion, in order to satisfy the conditions of the flying splice.

Moreover, it is highly desirable that the adhesives used for the adhesive tapes have a very good thermal shear strength.

Adhesive tapes with adhesives based on silicone, therefore, did not appear to the skilled person to be suitable for the application of the bonds in flying splice. There are indeed a series of silicone adhesives known which possess high tack properties. Consistently, however, these adhesives have very soft and fluid formulations and as a result do not sufficiently possess cohesion and thermal shear strength. To increase the cohesion it is possible, therefore, to subject these Si adhesives to crosslinking. In the prior art this has been done by free-radically chemical crosslinking, by means of benzoyl peroxide (BPO). As a result of this crosslinking process, however, the resultant adhesives experience a significant loss of tack and of adhesion. The skilled person was therefore well aware that crosslinked, silicone-based adhesives with sufficient cohesion unfortunately do not have adequate tack values in order to be used for adhesive tapes for flying splice.

It is an object of the invention to offer suitable adhesive tapes for splicing—more particularly, for flying splice—of flat web materials having siliconized surfaces or having silicone surfaces.

Adhesive tapes of this kind ought to feature pressure-sensitive adhesives (PSAs) which adhere outstandingly to silicone, which have high tack, more particularly such that they "grab" very well in very short contact times—in practice frequently $\leq 1$ ms—which additionally possess good cohesion, and advantageously also have good thermal shear properties.

For use as adhesives for adhesive tapes for splicing, more particularly for flying splice, moreover, the adhesive tapes ought to be such that they do not adversely affect the ready splittability of the splittable carriers of such adhesive tapes; more particularly, the adhesives ought not to migrate into the material of the splittable carrier—paper, for example—and lead to blocking therein.

This object has surprisingly been achieved by means of pressure-sensitive adhesive tapes comprising at least one splittable carrier and two layers of adhesive, at least one of the adhesives being a silicone adhesive. With particular advantage, an adhesive tape of this kind is suitable for achieving the object when the silicone adhesive is crosslinked by actinic radiation, more particularly by electron beams.

In the context of the present specification, the terms pressure-sensitive adhesive and self-adhesive composition are used synonymously. Pressure-sensitive adhesives may in principle be defined such that they exhibit properties of permanent adhesion at room temperature. At room temperature, more particularly without activation by solvents or heat, simply by pressure applied to the surface, they bring about a level of wetting which results in sufficient forces of adhesion. The requirements of the specific field of use that the PSAs of the present adhesive tapes are to satisfy will be set out in greater detail in the context of the present specification.

Carriers referred to as "splittable" are those which can be split parallel to their two-dimensional extent, and more particularly those which actually also split, based on the requirements in a splice process.

Splittable carriers contemplated include all splittable sheetlike carrier materials, more particularly readily splitting papers, composite paper systems (examples being duplex papers and sized paper systems), composite film systems (examples being sized film systems), composite polymeric systems (examples being coextruded composite polymeric systems) and polymeric nonwovens. Typically a carrier is employed in which the splitting force overall is 5 to 70 cN/cm, more particularly 12 to 60 cN/cm.

What is needed is for the upper self-adhesive composition and the lower self-adhesive composition to have a high bond strength. More particularly the bond strength of these self-adhesive compositions on the respective surfaces (carrier and web material for bonding) must be greater than the force required for splitting of the splittable carrier. Advantageous splittable carriers have splitting strengths, preferably, of 20 to 70 cN/cm, more particularly of 22 to 60 cN/cm, very especially of 25 to 50 cN/cm.

With particular preference the pressure-sensitive silicone adhesive (silicone PSA) is one comprising
a) at least one polydiorganosiloxane having the structure

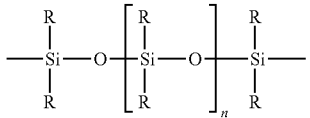

where the 2n+4 substituents R independently of one another are monovalent hydrocarbon radicals and n is an integer, and also
b) at least one resin ("MQ resin") constructed from $(R^2)_3SiO_{1/2}$ units ("M units") and $SiO_{4/2}$ units ("Q units") where the substituents $R^2$ of the M units independently of one another are alkyl groups, alkenyl groups, alkylsilyl groups, hydroxyl groups and/or hydrogen.

The MQ resins are advantageously those having a weight-average molecular weight $M_w$ of 500 g/mol$\leq M_w \leq$100,000 g/mol, preferably of 1000 g/mol$\leq M_w \leq$20,000 g/mol, very preferably of 2000 g/mol$\leq M_w \leq$5000 g/mol [the figures for the average molecular weight $M_w$ and the polydispersity D in this specification relate to determination by gel permeation chromatography (see later on below; experimental section)].

It has emerged as being favourable if adhesives are used in which the proportion—based on percent by weight—of polydiorganosiloxane to MQ resin is in the range from 20:80 to 80:20, preferably in the range from 30:70 through to 60:40.

One advantageous embodiment of the PSA tape of the invention (version V1) constitutes a pressure-sensitive adhesive tape for flying splice of flat web materials, comprising at least one splittable carrier and two layers of adhesive, where at least one of the adhesives is a pressure-sensitive silicone adhesive, more particularly an addition-crosslinking silicone PSA, comprising
a) at least one polydiorganosiloxane of the general formula

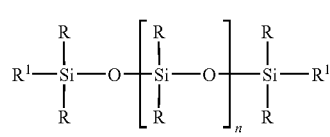

where
the two radicals $R^1$ are alkenyl groups chosen independently of one another,
the 2n+4 substituents R independently of one another are monovalent hydrocarbon radicals and
n is an integer, b) at least one resin ("MQ resin") constructed from $(R^2)_3SiO_{1/2}$ units ("M units") and $SiO_{4/2}$ units ("Q units") where
the substituents $R^2$ of the M units independently of one another are alkyl groups, alkenyl groups, alkylsilyl groups, hydroxyl groups or hydrogen,
c) at least one organohydrogenpolysiloxane which contains on average at least two silicon-bonded hydrogen atoms per polymer molecule and is free from olefinic double bonds.

In one advantageous development of this embodiment there are no further components in the silicone PSA. In further advantageous developments, however, the PSA may also have further components and/or the advantageous additives typical of silicone PSAs.

Advantageously the two radicals $R^1$ of the polydiorganosiloxane (I) independently of one another are alkenyl groups having 1 to 14 C atoms, more particularly vinyl groups and/or hexenyl groups.

It is particularly advantageous if the double bond of the alkenyl groups $R^1$ of the polydiorganosiloxane (I) is in each case terminal, i.e. in each case located between the furthest-removed and the second-furthest-removed C atom of the alkenyl group, as seen from the Si atom on which the alkenyl group is located.

The average value for the parameter n of the polydiorganosiloxane (I) is with more particular advantage chosen such that the weight-average molecular weight $M_w$ of the polydiorganosiloxane (I) is in the range of $7\times10^5$ g/mol$\leq M_w \leq 8\times10^5$ g/mol.

The polydispersity D of the polydiorganosiloxane (I) is very preferably in the range of $2.0 \leq D \leq 2.2$.

Component c is present—based on the overall composition—advantageously in a fraction of up to a few percent. It is advantageous to use those organohydropolysiloxanes whose weight-average molecular weight is in the range of $10^3$ g/mol$\leq M_w \leq 10^5$.

Very preferred polydiorganosiloxanes of version 1 are those reproduced by the following formulae (I-I) and (I-II)

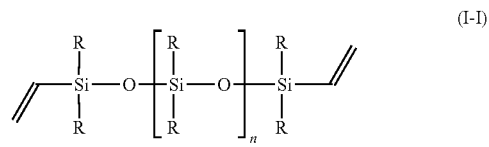

(I-I)

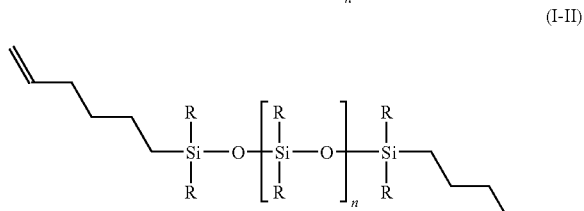

(I-II)

with more particular advantage when the above conditions for n, $M_w$ and D are also met.

One especially preferred embodiment of version V1 has a polydiorganosiloxane of the formula (I) with a weight-average molecular weight $M_w=7.68\times10^5$ g/mol and a polydispersity D=2.18. The MQ resin in this case is one having a weight-average molecular weight of $M_w=2350$ g/mol and a polydispersity of 2.51. The organohydropolysiloxane in this case has preferably 1 to 40 hydrogen atoms per alkenyl group of the polydiorganosiloxane.

An adhesive which has emerged as being a particularly favourable silicone adhesive for use for adhesive tapes of version V1 for flying splice is a commercially available addition-crosslinking system, namely the product DC 7657® from Dow Corning, this indication being only by way of example and not restricting the invention. Through the suitable choice, adapted to the particular silicone PSA, of the electron-beam dose (more particularly in the range from 5 kGy to 50 kGy), the acceleration rate (more particularly in the range from 100 kV to 200 kV) and the web speed (more particularly 10 m/min), a composition of this kind has particularly favourable bond strength, tack and thermal shear strength.

A further-advantageous embodiment of the PSA tape of the invention (version V2) is a pressure-sensitive adhesive tape for flying splice of flat web materials, comprising at least one splittable carrier and two layers of adhesive, characterized in that at least one of the adhesives is a pressure-sensitive silicone adhesive, more particularly a condensation-crosslinking silicone PSA, comprising a) at least one polydiorganosiloxane of the general formula

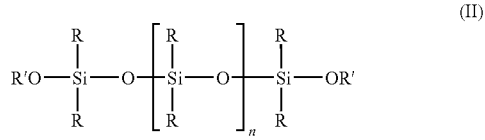

(II)

where
the two radicals $R^1$ are chosen independently of one another from the group consisting of hydrogen and also unbranched and branched alkyl radicals having 1 to 6 carbon atoms and/or alkylsilyl radicals and/or alkyloxysilyl radicals,
the 2n+4 substituents R independently of one another are monovalent hydrocarbon radicals and
n is an integer, b) at least one resin ("MQ resin") constructed from $(R^2)_3SiO_{1/2}$ units ("M units") and $SiO_{4/2}$ units ("Q units").
where
the substituents $R^2$ of the M units independently of one another are alkyl groups, alkenyl groups, alkylsilyl groups, hydroxyl groups or hydrogen.

One advantageous development of this embodiment has no further components in the silicone PSA. In further advantageous embodiments, however, the PSA may also have further components and/or the advantageous additives typical of silicone PSAs.

Compounds which have emerged as being preferred for version V2 are compounds, of the type of the polydiorganosiloxane (II), in which the two substituents R' are hydrogen atoms.

The average value for the parameter n of the polydiorganosiloxane (II) is with more particular advantage chosen such that the weight-average molecular weight $M_w$ of the polydiorganosiloxane (II) is in the range of $6.4 \times 10^5$ g/mol $\leq M_w \leq 1.0 \times 10^6$ g/mol.

The polydispersity D of the polydiorganosiloxane (II) is very preferably in the range of $2.3 \leq D \leq 2.8$, very preferably in the range of $2.38 \leq D \leq 2.80$.

Adhesives which have emerged as being particularly favourable silicone adhesives for use for adhesive tapes of version V2 for flying splice are a number of commercially available condensation-crosslinking systems, for instance the products DC 7358® from Dow Corning and the products Silgrip PSA 518® and Silgrip PSA 6574® from Momentive, this indication being only by way of example and not restricting the invention. Through the suitable choice, adapted to the particular silicone PSA, of the electron-beam dose (more particularly in the range from 5 kGy to 50 kGy), the acceleration rate (more particularly in the range from 100 kV to 200 kV) and the web speed (more particularly 10 m/min), compositions of this kind have a particularly favourable bond strength, tack and thermal shear strength.

For the polydiorganosiloxanes of all of the embodiments stated above it is favourable if the substituents R are chosen independently of one another from the group of hydrocarbon radicals having 1 to 18 carbon atoms, with advantageous hydrocarbon radicals being aliphatic saturated radicals or aromatic radicals. Preference is given to the polydiorganosiloxanes in which the substituents R independently of one another are methyl groups, unsubstituted phenyl groups and/or substituted phenyl groups. Particular preference is given to those polydiorganosiloxanes in which all of the substituents R are methyl groups, and also to those polydiorganosiloxanes in which some of the substituents R are methyl groups and the remainder of the substituents R are unsubstituted phenyl groups, in that case more particularly to poly(dimethyl-co-diphenyl)siloxanes and poly(dimethyl-co-methylphenyl)siloxanes.

The silicone adhesives of the adhesive tapes of the invention are preferably crosslinked with actinic radiation, very preferably by electron beams. In this context it has surprisingly been found that the silicone PSAs increase their cohesion, but no significant deterioration was found in the tacks. The silicone PSAs crosslinked by electron beams are therefore distinguishable from the PSAs crosslinked in accordance with the prior art (for example platinum catalysts, benzoyl peroxide).

Irradiation takes place advantageously with an electron-beam dose of more than 10 kGy, more particularly with an electron-beam dose of 15 kGy or more. The electron beam dose more particularly is chosen such that the microshear travel test (test C) gives a value of less than 1000 μm.

It is advantageous more particularly if the adhesive has a sufficient thermal shear strength. For this purpose it may be advantageous—depending on the chemical nature of the polydiorganosiloxanes used, MQ resins and the composition of the adhesive—to increase further the dose of the electron beam irradiation. One particularly advantageous embodiment of the invention therefore comes about through pressure-sensitive adhesives which meet exactly these thermal shear strength requirements. More particular advantage attaches to carrying out irradiation with an electron-beam dose of more than 15 kGy, preferably with an electron-beam dose of 20 kGy or more. By this means it is possible to exert advantageous influence on the thermal shear strength. Outstanding results are obtained, manifested in a SAFT test result of less than 1000 μm. Irradiation is carried out, with very special advantage, with a dose of 25 kGy or more. With irradiation at 25 kGy it is possible to improve still further the result of the SAFT test (test D) without occurrence of significant deteriorations in the bond strengths or in the tack values.

The degree of crosslinking can be quantified through the determination of the elastic component in the microshear travel test (test C). In that test, high values of the elastic component mean a high degree of crosslinking. Electron-beam crosslinking is therefore preferably carried out up to degrees of crosslinking which satisfy the requirements of the application for splicing. For the PSA tapes of the invention it is very advantageous if the elastic component is at least 50%, more preferably at least 60%, more preferably still at least 75%. Suitable with very particular advantage for the PSA tapes of the invention are those silicone PSAs which have an elastic component of at least 80%, more preferably of at least 90%.

The silicone adhesives proposed here in the context of this specification, of the kind outstandingly suitable for the adhesive tapes of the invention, can be characterized more closely by measurement in accordance with the conditions of tests A to D. The crosslinking parameters proposed for the silicone PSAs on the adhesive tapes of the invention (for example electron-beam dose, degree of crosslinking) can be transposed directly to the measurement samples. The silicone PSAs have—more particularly after crosslinking—advantageously a bond strength on steel of at least 2.0 N/cm, preferably of at least 2.5 N/cm and more preferably of at least 3.0 N/cm, when the underlying measurement method is test A1. Independently of this it is very favourable for the crosslinked silicone adhesives of the adhesive tapes of the invention to have, in accordance with measurement method test A2, a bond strength on silicone of at least 1 N/cm, more preferably of 1.5 N/cm and more preferably still of at least 2 N/cm. Adhesive tapes which have emerged as being especially advantageous are those which have silicone adhesives which under the conditions of test A2 possess a bond strength on silicone of at least 2.3 N/cm. A parameter which plays an important part for use in flying splice in respect of the suitability more particularly of the adhesive that effects the bond to the new flat web ("upper adhesive") is the realization of good tack properties. For the adhesive tapes of the invention it is therefore particularly advantageous if distance-based forces measured for the crosslinked silicone adhesives, more particularly for the upper silicone adhesive, in the test B1 (probe test) are at least 0.10 N/mm, more preferably at least 0.15 N/mm and more preferably at least 0.20 N/mm. Independently of this it is very advantageous if the corresponding crosslinked adhesives in the test B2 (loop test) have forces of at least 0.10 N, preferably of at least 0.20 N and more preferably of at least 0.25 N.

Good tack in the crosslinked adhesive is found more particularly when even the non-crosslinked adhesives have good tack.

Very advantageously in addition, outstanding cohesion forces are realized. This parameter is quantified using test C (microshear travel test). Preferably, for the crosslinked silicone adhesives of the adhesive tapes of the invention, cohesion properties are realized such that microshear travels are measured in this test of less than 1000 μm, more preferably of less than 500 μm and more preferably still of less than 300 μm.

The adhesive tapes of the invention are adhesive tapes having at least two layers of adhesive, at least one layer of adhesive being silicone-based, as described at length above. In principle the at least second layer of adhesive may be identical or different: thus the second layer of adhesive, for example, may be one based on polyacrylate, natural rubber, synthetic rubber, polyurethane, silylated polyurethanes, ethylene-vinyl acetate copolymers, polyisobutene, and also based on silicone with a basis identical to or different from that of the silicone PSAs already described. This listing, however, is not restrictive in the inventive sense, and so in principle—depending on the specific profile of requirements of the flat web materials to be joined—it is also possible to use pressure-sensitive adhesives based on other polymers.

The adhesive tapes of the invention for splicing, more particularly for flying splice, have at least one lower adhesive, whose purpose is to realize the adhesive bond to the old, outgoing flat web, and at least one upper adhesive, whose purpose is to mediate the adhesive bond to the start of the new flat web to be attached. Normally the flat webs to be joined to one another are the same: in other words, a flat web made from the same material of which the outgoing flat web is also composed is attached newly to the latter. Therefore it may be advantageous to use the same adhesives for the top adhesive and the bottom adhesive. It is very advantageous if both adhesives—bottom and top adhesives—are silicone adhesives of the kind described so far in this specification.

Since, however, the different conditions to which the respective compositions are exposed in the splicing process result in different requirements on the top adhesive and the bottom adhesive, it may well be advantageous deliberately to use different adhesives, adapted to the respective requirements. Hence it may also be very advantageous to use two silicone adhesives, as described in the context of this specification, but to choose the respective adhesive properties differently and to adapt them to the respective requirements.

Suitability is possessed with particular advantage by the adhesive tapes whose layers of self-adhesive composition meet one or more, very preferably all, of the following conditions:

Top silicone PSA:
    Bond strength on steel of 2.0 N/cm (Test A1)
    Bond strength on a siliconized substrate of 1.0 N/cm (Test A2)
    Tack corresponding to a force as measured by a probe tester of at least 0.10 N/mm$^2$ (Test B1)
    Tack on a siliconized substrate corresponding to a force as measured by loop tack of at least 0.10 N (Test B2)
    Cohesion corresponding to a microshear travel (Test C) of less than 1000 μm for an elastic component of greater than 60%
    Thermal shear strength as per SAFT test (Test D) of a shear travel of less than 1000 μm at 200° C.

Bottom silicone PSA:
    Bond strength on steel of 2.0 N/cm (Test A1)
    Bond strength on a siliconized substrate of 1.0 N/cm (Test A2)
    Cohesion corresponding to a microshear travel (Test C) of less than 1000 μm for an elastic component of greater than 60%
    Thermal shear strength as per SAFT test (Test D) of a shear travel of less than 1000 μm at 200° C.

The adhesive tapes of the invention have at least one splittable carrier material, at least one top adhesive for mediating the bond to the new flat web, and also at least one bottom adhesive for bonding on the outgoing roll of the flat web material.

For splicing, more particularly for flying splice, adhesive tapes of the invention that have emerged as being particularly advantageous are those which have an overall width of 20 to 100 mm, particularly of 30 to 70 mm, more particularly those having an overall width of 38 mm and those having an overall width of 50 mm. For specific embodiments, however, the advantageous dimensions may also differ from the values given above.

In an advantageous way the coatweight of the top self-adhesive composition is chosen within a range from 30 to 80 g/m$^2$, more particularly within a range from 35 to 60 g/m$^2$. The coatweight of the adhesive of the bottom side is preferably 20 to 60 g/m$^2$; a coat thickness of 35 to 50 g/m$^2$ is more particularly advantageous.

One advantageous embodiment of the adhesive tapes of the invention is constructed from a main carrier, which in particular is non-splitting, and a top self-adhesive composition, at least part of the reverse side of the main carrier being equipped with a double-sidedly adhesive, splittable system, which in turn has a splittable carrier which is equipped on its top side with an adhesive for bonding to the main carrier and on its bottom side with the bottom self-adhesive composition. In advantageous versions the splittable system is 3 to 20 mm, more particularly 6 to 12 mm, wide, more particularly for the overall adhesive tape widths identified earlier on above. The splittable system bonded underneath may be arranged flush to one long edge of the adhesive tape. For the use of the invention in flying splice, however, it has emerged as being very advantageous if the double-sided system bonded underneath is arranged at a distance from this long edge, more particularly at a distance of 1 to 7 mm, more preferably at a distance of 1.5 to 3.5 mm. As trials have shown, it is advantageous for a successful operation at high speeds to introduce the force for the splitting process into the splittable carrier of the splitting strip, since otherwise there are locally uncontrolled tearing processes (identified above as "tears"). For this purpose the above-lying section of the adhesive tape, defined by the distance of the splitting strip from the long edge, serves as an aid to force introduction. Tears were avoided particularly successfully when this distance reached a certain size. If, however, the recession is too great (greater than 3.5 mm), then there are increased instances of the above-lying, leading section of the adhesive splicing tape folding over, and also of uncontrolled behaviour during the splicing operation, as also found in trials.

In favourable embodiments there may also be more than one splittable system provided on the bottom side of the adhesive tape. In this sense, for example, constructions of the kinds set out in DE 198 30 674 A and DE 101 23 981 A are among those embraced by the concept of the invention, if they have been equipped with self-adhesive silicone compositions. Furthermore, for certain applications it may be favourable to provide a further, non-splitting system on the reverse side. Adhesive tapes of this kind are described in WO 03/24850 A; these constructions, in conjunction with the self-adhesive silicone compositions described in the present specification, are likewise embraced by the invention.

With advantage the adhesive tapes of the invention may have been provided on their top adhesive with a release material, for the purpose more particularly of protecting the adhesive during storage. It is possible here to use the materials familiar to the skilled person for silicone PSAs, examples of such materials being fluorosilicones. The release material may preferably be provided with a slit, a perforation or the like, arranged more particularly in the lengthwise direction of the adhesive tape, more particularly for the purpose of being able partly to remove the release material when the adhesive tape is partly bonded beneath the end of the topmost ply of the new roll, and hence also protecting the region of the adhesive, which would otherwise be exposed. The slit or perforation may be arranged advantageously at a distance of 20 to 40 mm from the long edge (LE2) of the adhesive tape, which is opposite the long edge (LE1) at which, or in whose vicinity, the splittable system is arranged.

The adhesive tapes of the invention may optionally be configured, by means of suitable devices, in such a way that they are machine-recognizable. This may be done, for example, by means of structural units that can be detected optically or otherwise. Reference may be made more particularly to the disclosure content of specifications WO 03/18451 A, WO 03/18452 A, WO 03/18453 A, WO 03/18454 A; the constructions described therein may likewise be realized advantageously for the adhesive tape of the invention.

The splitting mechanism of the adhesive tapes of the invention may alternatively also be realized in the manner proposed in DE 102 10 192 A.

It can be advantageous to configure the adhesive tapes of the invention such that at least the long edge at which splitting of the splitting carrier begins in the course of the flying splice exhibits a jagged cut, in accordance with a product construction as depicted, for example, in DE 100 58 956 A. Indeed, under certain operating conditions, it has emerged that a flying splice with the adhesive tapes of the invention provided with a jagged cut is more reliable as a result of the very low initial splitting force at the tip of the jag and the force which increases continuously as the area of the jag increases. Tears, accordingly, are effectively prevented.

The specifications DE 42 33 521 A, EP 450 312 A, EP 566 880 A, EP 757 657 A, U.S. Pat. Nos. 4,905,924 A, 6,432,241 A, 6,740,379 A and WO 91/08159 show further examples with adhesive tapes for splicing—more particularly, for flying splice—of flat web materials, each equipped with a top self-adhesive composition and a bottom self-adhesive composition. The embodiments of the present invention which are obtained by configuring at least one, preferably both, of the layers of adhesive of the above-cited specifications as silicone adhesives, as set out advantageously for the invention in the context of the present specification, are therefore likewise embraced by the subject matter of the invention.

Furthermore, it may be advantageous, instead of adhesive tapes extended "infinitely", so to speak, in the longitudinal direction, to use adhesive labels, in other words sections of adhesive tape cut to length.

BRIEF DESCRIPTION OF THE DRAWINGS

In the text below, the adhesive tapes of the invention will be described in more detail with reference to exemplary figures. In these figures

FIG. 1 shows an adhesive tape of the invention which is suitable for the flying splice of flat web material with siliconized surfaces and also for flat web material with silicone surfaces, in both cases wound up onto rolls. The adhesive tape is formed as a three-ply construction, comprising the splittable carrier 2, which is coated on its top side with the top self-adhesive composition 1 and on its bottom side with the bottom self-adhesive layer 3. A construction of this kind can be used more particularly when the splittable carrier 2 has sufficient mechanical robustness along its two-dimensional extent to be able to withstand the loads which occur when the web of the roll that is almost fully unwound is joined to the start of the web of the new roll.

Figure 1:
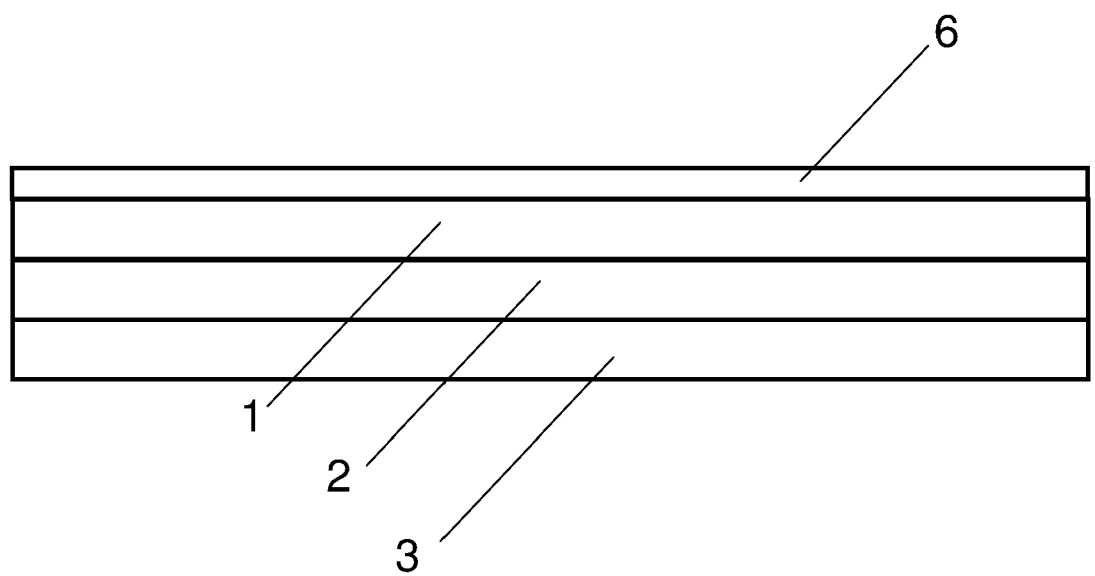
FIG. 1 shows a schematic side representation of one form of the adhesive tape of the invention (three-ply construction, shown transverse to the longitudinal direction of the adhesive tape)

The adhesive tape further comprises a release system 6 for the non-adhesive lining of the top self-adhesive composition 1, so that the top, adhesive side of the adhesive tape is protected in storage. As a release system it is possible to use all conventional release papers, such as siliconized release papers, or siliconized release films. The release system in this case may be configured in one-part or multi-part form (not shown in FIG. 1).

Figure 2:
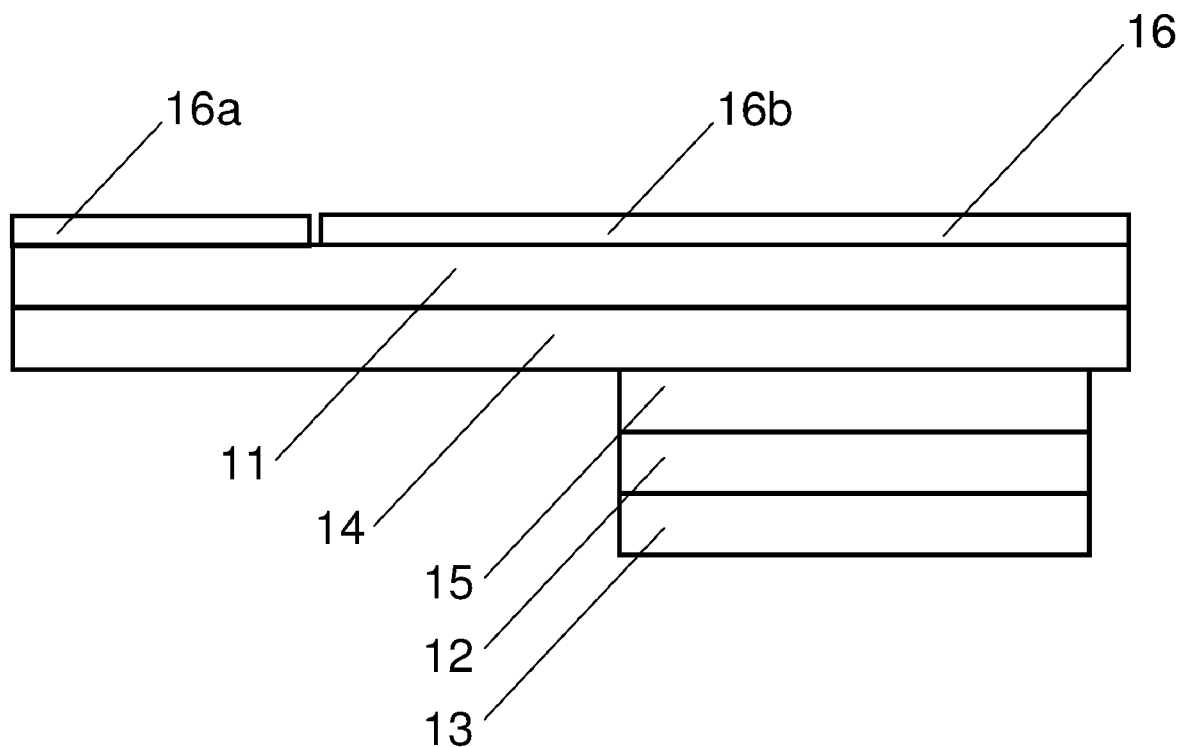
FIG. 2 shows a schematic side representation of a further form of the adhesive tape of the invention (five-ply construction, shown transverse to the longitudinal direction of the adhesive tape).

FIG. 2 shows a further particularly favourable form of the adhesive tape of the invention, as a five-ply construction. This form of the adhesive tape system comprises a splittable carrier 12 and a non-splittable carrier 14, which are joined to one another. The join in this case is configured as a separate, joining self-adhesive composition 15, which joins the top side of the splittable carrier 12 to part of the bottom side of the non-splittable carrier 14. Hence the non-splittable carrier 14 is coated on its top side with the top self-adhesive composition 11, and on part of its bottom side with the joining self-adhesive composition 15, which anchors the splittable carrier 12 on the non-splittable carrier 14. Located on the bottom side of the splittable carrier 12 is the bottom layer of adhesive, 13. The system comprising splittable carrier 12 and layers 13 and 15 of adhesive is in this case arranged with recession or offsetting relative to the non-splittable carrier 14.

The form shown in FIG. 2, furthermore, also has a release system 16 for the non-adhesive lining of the top self-adhesive composition 11. Particularly advantageous is the two-part release system 16a/16b shown here, which is divided in its longitudinal direction into a back liner part 16a and a front liner part 16b, by means, for instance, of a perforation or a slit. This has the advantage that the adhesive tape can first of all be bonded to the start of the web of a new roll, by exposure only of the adhesive region of the adhesive tape beneath the back liner part 16a, and the adhesive region for bonding with the web of the old roll continues to remain lined and hence protected by the front liner part 16b.

The invention further embraces the use of the adhesive tape of the invention for bonding flat web material with siliconized surfaces and with surfaces of silicone, said material being wound up onto rolls, in the course of a flying splice. The use of the adhesive tape produces a significant increase overall in the efficiency of the splicing process.

The invention offers, finally, a splicing process for the flying splice of non-polar flat web material wound up onto rolls, more particularly of flat web materials of this kind having siliconized surfaces or having surfaces of silicone, where the adhesive tape of the invention is adhered (at least partly) behind the end of the topmost web of a new roll of the flat web material, while the bottom side of the adhesive tape is bonded to the underneath web of the new roll and thereby secures it, after which the new roll thus equipped is placed adjacent to an almost entirely unwound roll that requires replacement, and is accelerated to substantially the same circumferential speed, and then the new roll is pressed against the topmost web of the old roll, the exposed self-adhesive composition of the adhesive tape being bonded to the old web when the webs have substantially the same speeds, while at the same time the splittable system splits, and non-adhesively lines the self-adhesive compositions of the splittable system with the two split remnants of the splittable carrier.

Preference is given to this method such that an adhesive tape having a slitted or perforated liner (release material) is used. On bonding beneath, initially only the smaller part of the slitted liner is removed, and the adhesive tape is adhered behind the topmost paper web of a new roll of paper by the exposed part of the self-adhesive composition, while the greater part of the liner is not removed until shortly before use for the flying splice.

The invention further provides a method of producing the pressure-sensitive adhesive tapes of the invention, in which the silicone PSA is coated onto at least one side of a carrier material and is crosslinked on said carrier material with electron beams. Crosslinking takes place preferably—as already set out earlier on above—with an electron-beam dose of at least 10 kGy, more preferably at least 15 kGy, more advantageously at least 20 kGy, with very particular preference at least 25 kGy. With further preference, crosslinking is carried out up to a degree of crosslinking which corresponds to an elastic component of at least 50%, more preferably at least 60%, more preferably at least 75%, with particular preference at least 90%, as determinable in the microshear travel test (Test C).

Experiments

Gel Permeation Chromatography GPC

The figures for the weight-average molecular weight $M_w$ and the polydispersity D in this specification refer to the determination by gel permeation chromatography. The determination is made on a 50 µl sample which has been subjected to clarifying filtration (sample concentration: 3 g/l). The eluent used is toluene. Measurement is made at 23° C. The pre-column used is a PSS-SDV column, 5 µ, $10^3$ Å, ID 8.0 mm×50 mm. Separation is carried out using columns of type PSS-SDV, 5 µ, $10^2$ Å and also $10^3$ Å and $10^5$ Å, each of ID 8.0 mm×300 mm (columns from Polymer Standards Service; detection by means of Shodex RI71 differential refractometer). The flow rate is 1.0 ml per minute. The calibration is made against PDMS standards (polydimethylsiloxane calibration).

Bond Strength Test (Test A)

The determination of the bond strength on steel was carried out as follows (tesa test A1): The defined substrate (bond strength plate) used was a ground steel plate. Prior to each measurement, this plate was cleaned with acetone. The sample for investigation was a standard polyester carrier with a thickness of 23 µm, coated on one side with the respective self-adhesive composition (self-adhesive coatweight: 50 g/m$^2$). A strip of the coated standard polyester carrier 20 mm wide was pressed onto the substrate under load (4 kg). Immediately thereafter, the adhesive tape was peeled from the substrate at an angle of 180° and a speed of 300 mm/min, and the force required to accomplish this at room temperature was measured. The measurement value (in N/cm) resulted as the average from three individual measurements.

The determination of the bond strength on silicone was carried out as follows (tesa test A2): The defined substrate used was a single-sidedly siliconized PET film (50 µm) which with the non-siliconized side was fastened to an ABS plate by means of a double-sided adhesive tape. The sample for investigation was a standard polyester carrier having a thickness of 23 µm, coated on one side with the respective self-adhesive silicone composition (self-adhesive coatweight: 50 g/m$^2$). A strip of the coated standard polyester carrier 20 mm wide was pressed under load (4 kg) onto the fixed, siliconized PET film. Immediately thereafter the adhesive tape was peeled from the substrate at an angle of 180° and a speed of 300 mm/min, and the force required to accomplish this at room temperature was measured. The measurement value (in N/cm) resulted as the average value from three individual measurements. To calibrate the tesa Test A2 measurement method, a commercial test adhesive tape for the testing of non-adhesive coatings ("tesa 7475" from tesa AG; bond strength on steel according to specification: 31.25 N/25 mm) was investigated by this measurement method; the bond strength determined in this case on the fixed, siliconized PET film was on average 0.3 N/cm.

Tack/(Test B)

The tack was determined by means of a probe tester (tesa Test B1) and by means of the loop tack test (tesa Test B2).

For the determination of the tack by means of a probe tack (tesa Test B1), a die was advanced onto the adhesive with a defined contact area and a defined force, and after a defined contact time was withdrawn again at a defined speed. The measure reported for the tack is the overall detachment energy (in N/mm) which must be expended in order to remove the die from the sample. The determination was made under test conditions of 23±1° C. and 50±5% relative humidity. The sample under analysis was a standard polyester carrier with a thickness of 23 µm, coated on one side with the respective self-adhesive silicone composition (self-adhesive coatweight: 50 g/m²). Fixing of the sample to a steel plate without air bubbles was done using a double-sided adhesive tape. The thermal-conditioning and peel-increase time was at least 12 hours under test conditions. The test plate with the sample under analysis was placed in the fixing device, and the die, cleaned with acetone and conditioned thermally (for 10 minutes) was advanced centrally onto the adhesive area, and withdrawn again, and the force expended in this case was measured. The measurement value (in N/mm) resulted as the average value from ten individual measurements. Measurement parameters chosen were a removal speed of 1.5 mm·s⁻¹, a contact time of 0.01 s and an applied pressure force of 0.7 N. The steel die has a diameter of 2.0 mm. Measuring instruments used were the texture analysers TA.XT 2i and also TA.XT plus from SMS (Stable Microsystem Ltd.).

In the case of the determination of the tack by means of the loop tack test (tesa Test B2), a test strip formed into a loop was advanced onto the adhesive, with a defined contact area and a defined force, and, after a defined contact time, was withdrawn again at a defined speed. The measure reported for the tack is the peak force (in N) which must be overcome in order to remove the loop from the sample. The determination was made under test conditions of 23±1° C. and 50±5% relative humidity. The defined substrate used was a siliconized paper (71 µm) which was fixed to an ABS plate by means of a double-sided adhesive tape. In order to calibrate the substrate of the "tesa test B2" measurement method, the release force was determined by means of a commercial test adhesive tape for the testing of non-adhesive coatings "tesa 7475" from tesa AG; bond strength on steel according to specification: 31.25 N/25 mm); the release force on the release paper, determined in this way, was on average 3-10 cN/cm. As the sample under analysis, a standard polyester carrier with a thickness of 23 µm was coated on one side with the respective self-adhesive silicone composition (self-adhesive coatweight: 50 g/m²). In addition the samples were reinforced on the reverse with a single-sided adhesive tape (tesa 4124). The measurement value (in N) resulted as the average value for 5 individual measurements. Measurement parameters chosen were a measurement speed of 600 mm·min⁻¹, a delay in the change in direction of 50 ms, and an applied pressure force (setpoint) of 0.15 N, the test strips having a length of 100 mm (clamped: 40 mm) and a width of 10 mm. Before being clamped, the respective specimens were creased in the longitudinal direction in order to give a small and defined measurement area.

Microshear Travel Test (Test C)

This test serves to test the shear strength of adhesive tapes under a temperature load of 40° C.

Sample preparation: The adhesive tape sample (PSA coated (50 g/m²) onto 23 µm PET film) is adhered to a ground, thermally conditionable, acetone-cleaned steel test plate and then rolled over six times with a 2 kg steel roller at a speed of 10 m/min. The bond area of the sample, height×width, is 13 mm×10 mm; the sample is suspended vertically, protruding beyond the steel test plate by 2 mm at the top edge, and is reinforced flush with a stable adhesive strip which serves as a support for the travel sensor.

Measurement: The sample for measurement is loaded at the bottom end with a weight of 100 g. The steel test plate with the bonded sample is heated to 40° C. A measurement is made, using the travel sensor, of the slip travel of the sample over a period of 15 minutes. After these first 15 minutes the weight is removed, and the relaxation is measured for a period of a further 15 minutes. The ratio (shear travel after 15 min (µm)) minus shear travel after 30 min (pm)/shear travel after 15 min (µm)) gives the elastic component (in %), which represents a measure of the network density. The maximum shear travel is set at 1000 µm; if this figure is exceeded, the test is discontinued. Test conditions: Room temperature 23±1° C., relative humidity 50±5%.

SAFT Test (Shear Adhesion Failure Temperature) (Test D)

This test serves to the accelerated testing of the shear strength of adhesive tapes under temperature load.

Sample preparation: The adhesive tape sample (PSA coated (50 g/m²) onto 23 µm PET film) is adhered to a ground, thermally conditionable, acetone-cleaned steel test plate and then rolled over six times with a 2 kg steel roller at a speed of 10 m/min. The bond area of the sample, height×width, is 13 mm×10 mm; the sample is suspended vertically, protruding beyond the steel test plate by 2 mm at the top edge, and is reinforced flush with a stable adhesive strip which serves as a support for the travel sensor.

Measurement: The sample for measurement is loaded at the bottom end with a weight of 50 g. The steel test plate with the bonded sample is heated, beginning at 25° C. and at a rate of 9° C. per minute, to the final temperature of 200° C. A measurement is made, using the travel sensor, of the slip travel of the sample as a function of temperature and time. The maximum slip travel is set at 1000 µm; if this figure is exceeded, the test is discontinued. Test conditions: room temperature 23±1° C., relative humidity 50±5%.

Positive Test Result:

Shear travel after attainment of final temperature (200° C.), reported in µm.

Negative Test Result:

Temperature when maximum shear travel (1000 µm) is attained, reported in ° C.

EXAMPLES

The index "PDMS" stands in the text below for the polydiorganosiloxane.

Addition-crosslinking Systems

Example A-1

Reference Composition 599 g of a 30% strength solution of a free-radically polymerized scaffold polymer consisting of 47% acrylic acid, 48% butyl acrylate and 5% vinyl caprolactam in a 1:1:1 mixture of water, isopropanol and acetone were blended with 397 g of Ethomeen C-25 (Akzo) and 2.9 g of aluminium chelate. The scaffold polymer is characterized, further, by a mass-average molar mass of 9*10⁵ g/mol and a polydispersity of 8. The pressure-sensitive adhesive (PSA) prepared in this way is coated, as a 30% strength solution in a 1:1:1 mixture of water, isopropanol and acetone, onto a primed PET film 23 µm thick. Following 120-minute conditioning at room temperature, the swatch was dried at 100° C. for 20 minutes. The coatweight after drying was 50 g/m².

Example A-2a

DC 7657® (1st Reference Example with Pt-crosslinking)

Specification of adhesive DC 7657®:
$M_{w,\ PDMS}=7.68\times10^5$ g/mol, $D_{PDMS}=2.18$, $M_{w,\ MQ\ resin}=4670$ g/mol, $D_{MQ\ resin}=2.51$, PDMS content (based on the sum of the fractions of PDMS and QM resin) 49.25% by weight, MQ resin content (based on the sum of the fractions of PDMS and QM resin) 50.75% by weight, manufacturer Dow Corning, substituents R=methyl The silicone composition DC 7657® was diluted with special-boiling-point spirit (b.p.=60-90° C.) to a solids content of 45%, admixed with 0.4% of Syl-Off 4000 (Pt catalyst mixture) and then applied to a primed PET film 23 μm thick. After 30-minute conditioning at room temperature the swatch was dried at 120° C. for 15 minutes. The coatweight after drying was 50 g/m².

Example A-2b

DC 7657Q® (2nd Reference Example with Pt-crosslinking)

The silicone composition DC 7657® was diluted with special-boiling-point spirit (b.p.=60-90° C.) to a solids content of 45%, admixed with 1.5% of Syl-Off 4000 (Pt catalyst mixture) and then applied to a primed PET film 23 μm thick. After 30-minute conditioning at room temperature the swatch was dried at 120° C. for 15 minutes. The coatweight after drying was 50 g/m².

Example A-3a

DC 7657®

The silicone composition DC 7657® was diluted with special-boiling-point spirit (b.p.=60-90° C.) to a solids content of 45% and then applied to a primed PET film 23 μm thick. After 30-minute conditioning at room temperature the swatch was dried at 120° C. for 15 minutes. The coatweight after drying was 50 g/m². Lastly the specimen was crosslinked with the following electron beam parameters: 15 kGy, 135 kV.

Example A-3b

DC 7657®

The silicone composition DC 7657® was diluted with special-boiling-point spirit (b.p.=60-90° C.) to a solids content of 45% and then applied to a primed PET film 23 μm thick. After 30-minute conditioning at room temperature the swatch was dried at 120° C. for 15 minutes. The coatweight after drying was 50 g/m². Lastly the specimen was crosslinked with the following electron beam parameters: 20 kGy, 135 kV.

Example A-3c

DC 7657®

The silicone composition DC 7657® was diluted with special-boiling-point spirit (b.p.=60-90° C.) to a solids content of 45% and then applied to a primed PET film 23 μm thick. After 30-minute conditioning at room temperature the swatch was dried at 120° C. for 15 minutes. The coatweight after drying was 50 g/m². Lastly the specimen was crosslinked with the following electron beam parameters: 25 kGy, 135 kV.

Example A-3d

DC 7657®

The silicone composition DC 7657® was diluted with special-boiling-point spirit (b.p.=60-90° C.) to a solids content of 45% and then applied to a primed PET film 23 μm thick. After 30-minute conditioning at room temperature the swatch was dried at 120° C. for 15 minutes. The coatweight after drying was 50 g/m². Lastly the specimen was crosslinked with the following electron beam parameters: 50 kGy, 135 kV.

Table 1 sets out the adhesive properties for the examples above.

TABLE 1

| | Bond strength, steel (Test A1) [N/cm] | Bond strength, silicone (Test A2) [N/cm] | Probe tack (Test B1) [N/mm] | Loop tack (Test B2) [N] | Microshear travel (Test C) [μm] | Microshear travel, elastic component (Test C) [%] | SAFT Test (Test D) [μm] |
|---|---|---|---|---|---|---|---|
| Example A-1 | 1.2 | 0.5 | n.b. | 0.039 | 564 | 65 | ≧1000 |
| Example A-2a | 4.7 | 3.7 | 0.157 | 0.166 | ≧1000 | — | ≧1000 |
| Example A-2b | 4.2 | 3.1 | 0.103 | 0.111 | 56 | 93 | 300 |
| Example A-3a | 4.3 | 3.3 | 0.115 | 0.128 | 287 | 90 | 224 |
| Example A-3b | 4.3 | 3.0 | 0.116 | 0.132 | 201 | 92 | 212 |
| Example A-3c | 4.2 | 2.9 | 0.112 | 0.128 | 197 | 96 | 201 |
| Example A-3d | 3.7 | 2.5 | 0.121 | 0.135 | 79 | 97 | 232 |

Example A-1 is a polyacrylate PSA which represents the prior art. For Examples A-2a-b, the silicone PSA was crosslinked by means of Pt catalyst; the examples serve as a reference. Examples 3a-d were crosslinked by means of electron beam.

Examples A-2a-b and A-3a-d in Table 1 demonstrate that in comparison to the polyacrylate reference (Example 1) the bond strength on silicone substrates is significantly higher in all cases. Furthermore, a SAFT test comparison shows that good cohesion properties at elevated temperatures are achieved by the electron-beam-crosslinked compositions (Examples A-3b-d). From all of the examples it is particularly clear that an increase in the electron-beam dose in every case raises the cohesion (shortening of the microshear travel), improves the thermal shear strength (shortening of the SAFT shear travel) while at the same time leaving the tack unaffected, whereas the platinum-catalyzed crosslinking results in a significant loss in tack.

For the addition-crosslinked examples (corresponding to embodiment version V1), elastic components of more than 90% are consistently realizable, with bond strengths on silicone of more than 2 N/cm, tack values in the probe test of more than 0.1 N/mm, and tack values in the loop test of more than 0.12 N being achieved.

Condensation-crosslinking Systems

Example C-1

Reference Composition (Identical to Example A-1)

599 g of a 30% strength solution of a free-radically polymerized scaffold polymer consisting of 47% acrylic acid, 48% butyl acrylate and 5% vinyl caprolactam in a 1:1:1 mixture of water, isopropanol and acetone were blended with 397 g of Ethomeen C-25 (Akzo) and 2.9 g of aluminium chelate. The scaffold polymer is characterized, further, by a mass-average molar mass of $9*10^5$ g/mol and a polydispersity of 8. The pressure-sensitive adhesive (PSA) prepared in this way is coated, as a 30% strength solution in a 1:1:1 mixture of water, isopropanol and acetone, onto a primed PET film 23 μm thick. Following 120-minute conditioning at room temperature, the swatch was dried at 100° C. for 20 minutes. The coatweight after drying was 50 g/m².

Example C-2a

DC Q2-7735® (as a Si-PSA Reference)

Specification of Adhesive DC Q2-7735®:
$M_{w,\ PDMS}=3.79\times10^5$, $D_{PDMS}=1.92$, $M_{w,\ MQ\ resin}=2310$, $D_{MQ\ resin}=2.51$, PDMS content (based on the sum of the fractions of PDMS and QM resin) 55.74% by weight, MQ resin content (based on the sum of the fractions of PDMS and QM resin) 44.26% by weight, manufacturer Dow Corning, substituents R=methyl The silicone composition DC Q2-7735® was diluted with special-boiling-point spirit (b.p.=60-90° C.) to a solids content of 45% and then applied to a primed PET film 23 μm thick. After 30-minute conditioning at room temperature the swatch was dried at 120° C. for 15 minutes. The coatweight after drying was 50 g/m².

Example C-2b

DC Q2-7735® (as a Non-tacky Si-PSA Reference)

The silicone composition DC Q2-7735® was diluted with special-boiling-point spirit (b.p.=60-90° C.) to a solids content of 45% and then applied to a primed PET film 23 μm thick. After 30-minute conditioning at room temperature the swatch was dried at 120° C. for 15 minutes. The coatweight after drying was 50 g/m². Lastly the specimen was crosslinked with the following electron beam parameters: 10 kGy, 135 kV, 10 m/min.

Example C-2c

DC Q2-7735® (as a Non-tacky Si-SPA Reference)

The silicone composition DC Q2-7735® was diluted with special-boiling-point spirit (b.p.=60-90° C.) to a solids content of 45% and then applied to a primed PET film 23 μm thick. After 30-minute conditioning at room temperature the swatch was dried at 120° C. for 15 minutes. The coatweight after drying was 50 g/m². Lastly the specimen was crosslinked with the following electron beam parameters: 15 kGy, 135 kV, 10 m/min.

Example C-2d

DC Q2-7735® (as a Non-tacky Si-PSA Reference)

The silicone composition DC Q2-7735® was diluted with special-boiling-point spirit (b.p.=60-90° C.) to a solids content of 45% and then applied to a primed PET film 23 μm thick. After 30-minute conditioning at room temperature the swatch was dried at 120° C. for 15 minutes. The coatweight after drying was 50 g/m². Lastly the specimen was crosslinked with the following electron beam parameters: 20 kGy, 135 kV, 10 m/min.

Example C-3a

DC 7358®

Specification of adhesive DC 7358®:
$M_{w,\ PDMS}=6.44\times10^5$, $D_{PDMS}=2.38$, $M_{w,\ MQ\ resin}=2350$, $D_{MQ\ resin}=1.83$, PDMS content (based on the sum of the fractions of PDMS and QM resin) 46.70% by weight, MQ resin content (based on the sum of the fractions of PDMS and QM resin) 53.30% by weight, manufacturer Dow Corning, substituents R=methyl The silicone composition DC 7358® was diluted with special-boiling-point spirit (b.p.=60-90° C.) to a solids content of 45% and then applied to a primed PET film 23 μm thick. After 30-minute conditioning at room temperature the swatch was dried at 120° C. for 15 minutes. The coatweight after drying was 50 g/m².

Example C-3b

DC 7358®

The silicone composition DC 7358® was diluted with special-boiling-point spirit (b.p.=60-90° C.) to a solids content of 45% and then applied to a primed PET film 23 μm thick. After 30-minute conditioning at room temperature the swatch was dried at 120° C. for 15 minutes. The coatweight after drying was 50 g/m². Lastly the specimen was crosslinked with the following electron beam parameters: 15 kGy, 135 kV, 10 m/min.

Example C-3c

DC 7358®

The silicone composition DC 7358® was diluted with special-boiling-point spirit (b.p.=60-90° C.) to a solids content of 45% and then applied to a primed PET film 23 μm thick. After 30-minute conditioning at room temperature the swatch was dried at 120° C. for 15 minutes. The coatweight after drying was 50 g/m². Lastly the specimen was crosslinked with the following electron beam parameters: 20 kGy, 135 kV, 10 m/min.

Example C-3d

DC 7358®

The silicone composition DC 7358® was diluted with special-boiling-point spirit (b.p.=60-90° C.) to a solids content of 45% and then applied to a primed PET film 23 μm thick. After 30-minute conditioning at room temperature the swatch was dried at 120° C. for 15 minutes. The coatweight after drying was 50 g/m². Lastly the specimen was crosslinked with the following electron beam parameters: 25 kGy, 135 kV, 10 m/min.

Example C-4a

Silgrip PSA 518®

Specification of adhesive Silgrip PSA 518®:
$M_{w,\ PDMS}$=9.16×10⁵, $D_{PDMS}$=2.80, $M_{w,\ MQ\ resin}$=4110, $D_{MQ\ resin}$=2.27, PDMS content (based on the sum of the fractions of PDMS and QM resin) 51.20% by weight, MQ resin content (based on the sum of the fractions of PDMS and QM resin) 48.80% by weight, manufacturer Momentive, substituents R=methyl and phenyl The silicone composition Silgrip PSA 518® was diluted with special-boiling-point spirit (b.p.=60-90° C.) to a solids content of 45% and then applied to a primed PET film 23 μm thick. After 30-minute conditioning at room temperature the swatch was dried at 120° C. for 15 minutes. The coatweight after drying was 50 g/m².

Example C-4b

Silgrip PSA518®

The silicone composition Silgrip PSA 518® was diluted with special-boiling-point spirit (b.p.=60-90° C.) to a solids content of 45% and then applied to a primed PET film 23 μm thick. After 30-minute conditioning at room temperature the swatch was dried at 120° C. for 15 minutes. The coatweight after drying was 50 g/m². Lastly the specimen was crosslinked with the following electron beam parameters: 15 kGy, 135 kV, 10 m/min.

Example C-4c

Silgrip PSA 518®

The silicone composition Silgrip PSA 518® was diluted with special-boiling-point spirit (b.p.=60-90° C.) to a solids content of 45% and then applied to a primed PET film 23 μm thick. After 30-minute conditioning at room temperature the swatch was dried at 120° C. for 15 minutes. The coatweight after drying was 50 g/m². Lastly the specimen was crosslinked with the following electron beam parameters: 20 kGy, 135 kV, 10 m/min.

Example C-5a

Silgrip) PSA 6574®

Specification of adhesive Silgrip PSA 6574®:
$M_{w,\ PDMS}$=1.00×10⁶, $D_{PDMS}$=2.78, $M_{w,\ MQ\ resin}$=4230, $D_{MQ\ resin}$=2.00, PDMS content (based on the sum of the fractions of PDMS and QM resin) 30.15% by weight, MQ resin content (based on the sum of the fractions of PDMS and QM resin) 69.85% by weight, manufacturer Momentive, substituents R=methyl and phenyl The silicone composition Silgrip PSA 6574® was diluted with special-boiling-point spirit (b.p.=60-90° C.) to a solids content of 45% and then applied to a primed PET film 23 μm thick. After 30-minute conditioning at room temperature the swatch was dried at 120° C. for 15 minutes. The coatweight after drying was 50 g/m².

Example C-5b

Silgrip PSA 6574®

The silicone composition Silgrip PSA 6574® was diluted with special-boiling-point spirit (b.p.=60-90° C.) to a solids content of 45% and then applied to a primed PET film 23 μm thick. After 30-minute conditioning at room temperature the swatch was dried at 120° C. for 15 minutes. The coatweight after drying was 50 g/m². Lastly the specimen was crosslinked with the following electron beam parameters: 15 kGy, 135 kV, 10 m/min.

Example C-5c

Silgrip PSA 6574®

The silicone composition Silgrip PSA 6574® was diluted with special-boiling-point spirit (b.p.=60-90° C.) to a solids content of 45% and then applied to a primed PET film 23 μm thick. After 30-minute conditioning at room temperature the swatch was dried at 120° C. for 15 minutes. The coatweight after drying was 50 g/m². Lastly the specimen was crosslinked with the following electron beam parameters: 20 kGy, 135 kV, 10 m/min.

Example C-5d

Silgrip PSA 6574®

The silicone composition Silgrip PSA 6574® was diluted with special-boiling-point spirit (b.p.=60-90° C.) to a solids content of 45% and then applied to a primed PET film 23 μm thick. After 30-minute conditioning at room temperature the swatch was dried at 120° C. for 15 minutes. The coatweight after drying was 50 g/m². Lastly the specimen was crosslinked with the following electron beam parameters: 25 kGy, 135 kV, 10 m/min.

Table 2 sets out the adhesive properties for the further examples.

TABLE 2

| | Bond strength, steel (Test A1) [N/cm] | Bond strength, silicone (Test A2) [N/cm] | Probe tack (Test B1) [N/mm] | Loop tack (Test B2) [N] | Microshear travel (Test C) [μm] | Microshear travel, elastic component (Test C) [%] | SAFT Test (Test D) [μm] |
|---|---|---|---|---|---|---|---|
| Example C-1 | 1.2 | 0.5 | n.b. | 0.039 | 564 | 65 | ≧1000 |
| Example C-2a | 4.4 | 3.5 | 0.022 | 0.029 | 315 | 24 | ≧1000 |
| Example C-2b | 4.8 | 3.7 | 0.022 | 0.027 | 153 | 55 | ≧1000 |
| Example C-2c | 4.7 | 3.6 | 0.024 | 0.031 | 145 | 58 | 879 |
| Example C-2d | 4.7 | 3.6 | 0.023 | 0.029 | 131 | 64 | 690 |
| Example C-3a | 4.4 | 2.4 | 0.163 | 0.129 | ≧1000 | — | ≧1000 |
| Example C-3b | 4.4 | 2.6 | 0.152 | 0.119 | 970 | 65 | ≧1000 |
| Example C-3c | 4.4 | 2.6 | 0.155 | 0.121 | 863 | 71 | 996 |
| Example C-3d | 4.4 | 2.6 | 0.148 | 0.117 | 661 | 83 | 658 |
| Example C-4a | 3.5 | 2.6 | 0.258 | 0.293 | ≧1000 | — | ≧1000 |
| Example C-4b | 3.6 | 2.4 | 0.217 | 0.260 | 614 | 80 | 476 |
| Example C-4c | 3.7 | 2.5 | 0.223 | 0.265 | 271 | 91 | 354 |
| Example C-5a | 5.2 | 3.1 | 0.153 | 0.144 | ≧1000 | — | ≧1000 |
| Example C-5b | 4.9 | 2.8 | 0.251 | 0.287 | 847 | 75 | 697 |
| Example C-5c | 4.9 | 2.8 | 0.263 | 0.302 | 645 | 81 | 545 |
| Example C-5d | 4.8 | 2.7 | 0.258 | 0.295 | 537 | 87 | 487 |

Example C-1 is a polyacrylate PSA which represents the prior art. For Examples C-2a-d a non-tacky silicone PSA was used; the examples serve as reference.

Examples C-2a-d, C-3a-d, C-4a-c and C-5a-d in Table 2 demonstrate that in comparison to the polyacrylate reference (Example 1) the bond strength on silicone substrates is significantly higher in all cases. Furthermore, a SAFT test comparison shows that good cohesion properties at elevated temperatures are achieved only by means of sufficiently electron-beam-crosslinked compositions (Examples C-2c-d, C-3c-d, C-4b-c and C-5b-d), whereas the silicone PSAs which were given no electron beam aftertreatment or inadequately dosed electron-beam aftertreatment (Examples C-2a-b, C-3a-b, C-4a and C-5a) in all cases reach a shear travel of significantly more than 1000 μm. From the inventive examples it is particularly clear that an increase in the electron-beam dose in every case raises the cohesion (shortening of the microshear travel), improves the thermal shear strength (shortening of the SAFT shear travel) while at the same time leaving the tack unaffected Results The silicone PSAs—more particularly, addition-crosslinking silicone PSAs—as used for embodiment V1 of the PSA tape of the invention are typically used, in accordance with the prior art, either as solvent borne adhesives in toluene or in toluene/xylene mixtures, or as 100% systems, and in the case of commercially available products are provided in that form by the respective manufacturer. According to the prior art, systems of this kind are crosslinked by means of platinum catalysts at 90-120° C. These compositions, crosslinkable in this way, generally exhibit low tacks which are inadequate for use as adhesives for flying splice and are dependent on the crosslinking reaction, since the number and nature of the nodal points are predetermined by the vinyl and hydrogen functionalities. Hence, furthermore, it is possible to formulate high thermal shear strengths. However, this system also has disadvantages. Platinum catalysts on the one hand are very costly, and on the other hand react very sensitively, in chemical terms, to impurities, being easily poisoned. Furthermore, these compounds must likewise be incorporated into the silicone adhesive in an additional operating step, after which the adhesive has a reduced potlife, or processing time.

Sufficiently good pressure-sensitive adhesion properties of the PSAs, more particularly of the condensation-crosslinking PSAs, as used for adhesive tape version V2, are frequently obtained as soon as after the solvents have been evaporated. However, the thermal shear strength of these non-crosslinked silicone PSAs is low. The window for application covers only the range up to a maximum of 120° C., often only up to 90° C. In order to achieve the required thermal shear strength, more particularly of 250° C. or more, it is advantageous additionally to subject the silicone PSAs to a crosslinking reaction, which adversely affects the tack in the case of the prior-art crosslinking methods. Conventionally, this crosslinking is by chemical reactions.

In the case of these silicone adhesives consisting of polysiloxane of the formula (II) and MQ resins, peroxides are conventionally used as crosslinking reagents. In terms of the thermal shear strength, good results can be achieved to some extent with peroxides. Conventionally, however, it is not possible to raise the cohesion without significantly minimizing the tack. Moreover, there are further disadvantages associated with peroxide reagents. On the one hand, the storage and handling of peroxides are classed as potentially hazardous. Furthermore, the number of operating steps and also the costs are necessarily increased by the need for incorporation into the silicone adhesive by mixing. And, finally, peroxides that can be used to crosslink silicone PSAs require reaction temperatures of at least 160° C. Although it is possible, with the aid of amine accelerants, to increase the reaction rate or to lower the reaction temperature, it is nevertheless necessary in that case to accept a reduced UV stability in tandem with a yellow discoloration of the silicone PSA. Furthermore, the silicone PSAs may undergo complete crosslinking in this procedure, and so lose their tack entirely.

Surprisingly, crosslinking by means of actinic radiation, more particularly by means of electron beams, offers distinct advantages in relation to the conventional methods identified above. An extremely positive, surprising and unexpected aspect of the electron beam curing (electron beam) in relation both to crosslinking by means of platinum catalysts and to crosslinking by means of peroxides is the fact that the crosslinking and hence the cohesion of the silicone PSA can be steplessly varied over a relatively wide range without detriment to the tack. In addition, the electron-beam dose can be adapted or altered in the course of coating, in an in-line operation, and so adhesive tapes with different coatweights can be crosslinked individually and produced in one coating operation.

Advantageously according to the invention the silicone adhesive is subjected to electron-beam crosslinking on the adhesive tape. It has been found, surprisingly and in a manner which the skilled person could not have expected, that the silicone adhesives as characterized above, when crosslinked by means of electron beams, do undergo the desired increase in cohesion, but without detraction from their outstanding properties in terms of tack and adhesion.

Through irradiation with high-energy radiation (electron beams) in suitable dose ranges, the parameters of tack, adhesion, cohesion and thermal shear strength can be variously optimized for the desired profile of requirements. Within advantageous dose limits, it is possible, for each adhesive as characterized in accordance with the invention, to find a dose at which the parameters adopt an optimum in terms of the overall requirements.

The adhesive tapes offered in accordance with the invention are therefore, surprisingly, outstandingly suitable for the requirements imposed by the flying splice of flat web materials having silicone surfaces or siliconized surfaces. Success has been achieved in setting and optimizing the profile of properties required. Hence, surprisingly, adhesive tapes can be offered which have good pressure-sensitive adhesion with respect to silicone-containing surfaces, and combine very good tack values with good cohesion properties as well.

With the adhesive tapes of the invention, success has been achieved, without operating errors, in carrying out the flying splice of siliconized flat web materials and of flat web materials with a silicone surface.

The invention claimed is:

1. Pressure-sensitive adhesive tape for flying splice of flat web materials, comprising at least one splittable carrier and two layers of adhesive, wherein at least one of the adhesives is an electron-beam crosslinked pressure-sensitive silicone adhesive.

2. Pressure-sensitive adhesive tape according to claim 1, wherein the pressure-sensitive adhesive possesses an elastic component of at least 50% as determinable in the microshear travel test (test C).

3. Pressure-sensitive adhesive tape according to claim 1, wherein said at least one pressure-sensitive silicone adhesive comprises a) at least one polydiorganosiloxane having the structure

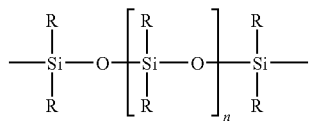

where
the 2n+4 substituents R independently of one another are monovalent hydrocarbon radicals and
n is an integer,
and also comprises
b) at least one resin ("MQ resin") constructed from $(R^2)_3SiO_{1/2}$ units ("M units") and $SiO_{4/2}$ units ("Q units")
where
the substituents $R^2$ of the M units independently of one another are alkyl groups, alkenyl groups, alkylsilyl groups, hydroxyl groups or hydrogen.

4. Pressure-sensitive adhesive tape for flying splice of flat web materials, comprising at least one splittable carrier and two layers of adhesive, wherein at least one of the adhesives is a pressure-sensitive silicone adhesive (silicone PSA) comprising a) at least one polydiorganosiloxane of the formula

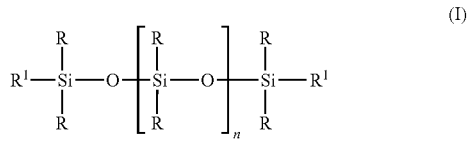

(I)

where
the two radicals $R^1$ are alkenyl groups chosen independently of one another,
the 2n+4 substituents R independently of one another are monovalent hydrocarbon radicals and
n is an integer,
b) at least one resin ("MQ resin") constructed from $(R^2)_3SiO_{1/2}$ units ("M units") and $SiO_{4/2}$ units ("Q units")
where
the substituents $R^2$ of the M units independently of one another are alkyl groups, alkenyl groups, alkylsilyl groups, hydroxyl groups or hydrogen,
c) at least one organohydrogenpolysiloxane which contains on average at least two silicon-bonded hydrogen atoms per polymer molecule and is free from olefinic double bonds, said at least one adhesive being electron-beam crosslinked.

5. Pressure-sensitive adhesive tape according to claim 4, wherein the two radicals $R^1$ are vinyl groups and/or hexenyl groups chosen independently of one another.

6. Pressure-sensitive adhesive tape according to claim 4, wherein the double bond of the alkenyl group is terminal, i.e. is located between the furthest-removed and the second-furthest-removed C atom of the alkenyl group, as seen from the Si atom on which the alkenyl group is located.

7. Pressure-sensitive adhesive tape according to claim 4, wherein an average value for n is chosen such that the weight-average molecular weight $M_W$ of the polydiorganosiloxane (I) is in the range of $7 \times 10^5$ g/mol $\leq M_W \leq 8 \times 10^5$ g/mol.

8. Adhesive tape according to claim 4, wherein a polydispersity D of the polydiorganosiloxane (I) is in the range of $2.0 \leq D \leq 2.2$.

9. Pressure-sensitive adhesive tape for flying splice of flat web materials, comprising at least one splittable carrier and two layers of adhesive, wherein at least one of the adhesives is a pressure-sensitive silicone adhesive (silicone PSA) comprising
a) at least one polydiorganosiloxane of the formula

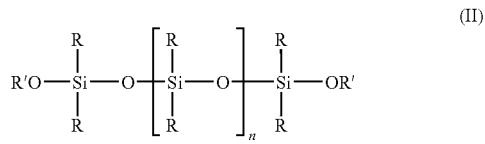
(II)

where
the two radicals R' are chosen independently of one another from the group consisting of hydrogen and also unbranched and branched alkyl radicals having 1 to 6 carbon atoms and/or alkylsilyl radicals and/or alkyloxysilyl radicals,
the 2n+4 substituents R independently of one another are monovalent hydrocarbon radicals and
n is an integer,
b) at least one resin ("MQ resin") constructed from $(R^2)_3SiO_{1/2}$ units ("M units") and $SiO_{4/2}$ units ("Q units"),
where
the substituents $R^2$ of the M units independently of one another are alkyl groups, alkenyl groups, alkylsilyl groups, hydroxyl groups or hydrogen, said at least one adhesive being electron-beam crosslinked.

10. Pressure-sensitive adhesive tape according to claim 9, wherein the two substituents R' are hydrogen atoms.

11. Pressure-sensitive adhesive tape according to claim 9, wherein an average value for n is chosen such that the weight-average molecular weight $M_W$ of the polydiorganosiloxane (II) is in the range of $6.4 \times 10^5$ g/mol $\leq M_W \leq 1.0 \times 10^6$ g/mol.

12. Adhesive tape according to claim 9, wherein a polydispersity D of the polydiorganosiloxane (II) is in the range of $2.3 \leq D \leq 2.8$.

13. Pressure-sensitive adhesive tape according to claim 3, wherein the substituents R are independently of one another selected from the group consisting of hydrocarbon radicals having 1 to 18 carbon atoms.

14. Pressure-sensitive adhesive tape according to claim 1, wherein the substituents R are independently of one another selected from the group consisting of methyl groups, unsubstituted phenyl groups and substituted phenyl groups.

15. Pressure-sensitive adhesive tape according to claim 1, wherein the MQ resin is one having a weight-average molecular weight $M_W$ of 500 g/mol $\leq M_W \leq 100,000$ g/mol.

16. Method of producing the pressure-sensitive adhesive tape of claim 1, comprising coating the at least one pressure-sensitive silicone adhesive onto at least one side of a carrier material and crosslinking on said carrier material with electron beams.

17. Method according to claim 16, wherein said crosslinking is performed with an electron-beam dose of at least 10 kGy.

18. Method according to claim 17, wherein said crosslinking is carried out up to a degree of crosslinking which corresponds to an elastic component of at least 50% as determinable in the microshear travel test (test C).

* * * * *